United States Patent [19]
Foster et al.

[11] 3,887,740
[45] June 3, 1975

[54] PROCESS FOR DEPOSITING OXIDE COATINGS

[75] Inventors: Gordon F. Foster, Campbell; Helmuth E. Meissner; Janice L. Stiles, both of Painted Post, all of N.Y.

[73] Assignee: Corning Glass Works, Corning, N.Y.

[22] Filed: May 1, 1972

[21] Appl. No.: 249,353

[52] U.S. Cl............ 428/116; 117/169 R; 427/238; 427/244; 428/17; 428/539; 252/477 R
[51] Int. Cl............................................ B44d 1/44
[58] Field of Search............ 117/62, 98, 99, 123 B, 117/123 A, 127, 169 R

[56] References Cited
UNITED STATES PATENTS

| | | | |
|---|---|---|---|
| 2,406,692 | 8/1946 | Jones | 117/62 |
| 2,496,649 | 2/1950 | Zelley | 117/62 |
| 3,112,215 | 11/1963 | Ruosch et al. | 117/62 |
| 3,671,292 | 6/1972 | Hirshfield et al. | 117/62 |
| 3,709,712 | 1/1973 | Rossman | 117/62 |

Primary Examiner—William D. Martin
Assistant Examiner—Janyce A. Bell
Attorney, Agent, or Firm—Kees van der Sterre; Clinton S. Janes, Jr.; Clarence R. Patty, Jr.

[57] ABSTRACT

A process for depositing uniform, pure, high-surface-area metal oxide coatings on porous support structures is disclosed. The process comprises the impregnation of the support structure with an aqueous ionic solution of a selected metal followed by treatment of the impregnated support structure with ammonia or ammonia alkaline solutions to cause the in situ precipitation on the support structure of a hydrated metal oxide coating. Such metal oxide coatings are useful as catalysts or catalyst supports.

6 Claims, No Drawings

PROCESS FOR DEPOSITING OXIDE COATINGS

BACKGROUND OF THE INVENTION

The present invention has general applicability in the field of catalysts and particular utility in the production of metal oxide coatings on support structures which are to be employed with base or noble metal catalysts to treat waste gases. The process is particularly useful in the preparation of monolithic catalytic converter units to be employed, for example, with internal combustion engines for the purpose of controlling carbon monoxide, hydrocarbons and nitrogen oxide exhaust emissions.

Uniformity of deposited metal oxide coatings on monolithic catalytic converter units is a prerequisite to optimal and reproducible performance. One well-known method of application comprises the application of oxides as slurries; however, such methods typically require the use of binders such as silica or alumina in order to obtain sufficient abrasion resistance in the coating. A mechanically tough coating is required, particularly under operating conditions involving high gas velocities such as might be encountered in treating combustion exhaust gases, in order to avoid the loss of catalytic material. However, the addition of such binders is often undesirable on account of interactions between the supported catalyst and the binder which cause deteriorations in catalytic activity.

Alternative methods of oxide deposition such as the calcination of metal salts deposited from salt solutions also have inherent disadvantages. Simple impregnation with metal salt solutions does not yield a uniform salt coating using conventional drying procedures, and the calcination process typically produces a lower surface area oxide coating than would be desirable for a catalytic support material.

It is, therefore, one object of the present invention to provide a process for depositing a metal oxide coating on a porous support structure which provides a tightly-adhering, high-surface-area coating without the need for binders or high-temperature calcining treatments.

It is a further object of the invention to provide high-surface-area metal oxide coatings, and devices embodying such coatings, which are particularly suitable for use as catalysts or catalyst supports.

Other objects and advantages of the invention will become apparent from the following description and detailed examples thereof.

SUMMARY OF THE INVENTION

Briefly, our invention comprises a process for depositing a metal oxide coating on a porous support structure comprising the steps of impregnating the support structure with an aqueous ionic solution of a selected metal, and thereafter contacting the impregnated support structure with ammonia or aqueous ammonia alkaline solutions to cause the in situ precipitation of a hydrated metal oxide in the pores of the structure and on the surface thereof. The resulting adherent, high-surface-area coating may subsequently be heated to remove water and other volatile species.

The selected metal must be one which forms a hydrated oxide which is not readily soluble in ammonia alkaline solutions, and, preferably, which forms a refractory oxide. Suitable metals include divalent metals such as $Mn^{+2}$ and Mg, trivalent metals such as Al, Ga, Cr, Fe, and the rare earth metals, and tetra- and higher valent metals such as Ti, Zr, Hf, Th, Sn, Nb, and Ta.

The ammonia treatment of the support structure which has been impregnated with an ionic solution of a suitable metal may be carried out by contact with aqueous ammonia alkaline solutions such as ammonium hydroxide or ammonium carbonate, or by contact with ammonia-containing gases. In either case, contact with ammonia in the aqueous environment causes the in situ precipitation of a hydrated metal oxide, which may be in the form of a hydrous oxide, an oxyhydrate or a hydroxide of the selected metal. The in situ precipitation process produces a very uniform, tightly-adherent, high-surface-area coating.

DESCRIPTION OF THE PREFERRED EMBODIMENTS

Porous support structures which are most advantageously treated according to the process of the present invention are refractory ceramic structures of the honeycomb type, such as are described, for example, in the patent to Hollenbach, U.S. Pat. No. 3,112,184. These structures are particularly suitable for use in catalytic processes because they have high surface-area-to-weight ratios which maximize gas-catalyst contact. They are typically composed of cordierite, petalite, spodumene, silica, alumina, titania or any other of a wide variety of refractory crystalline compounds or solid solutions which can be used to form a honeycomb body of acceptable strength. Alternatively, dense support structures with porous surface layers may be employed. The composition of the support structure is not critical and metal, glass, or glass-ceramic support structures may alternatively be employed, provided some porosity and surface roughness is imparted thereto which will permit a useful degree of metal solution impregnation and mechanical bonding of the oxide coating.

Preferred aqueous ionic solutions include concentrated solutions of ionic compounds of the selected metals, such as their chloride and nitrate salts, preferably having pH values not exceeding about 7. Impregnation of the porous support structure with such solutions may conveniently be accomplished by immersion of the structure in the solution for a period of time at least sufficient to thoroughly wet the porous surface of the support. Such techniques as vacuum impregnation may be employed to minimize air entrapment, thus improving the pore penetration and the adherence and uniformity of the ultimate coating. Of course, the solutions may contain compounds of more than one metal where mixed oxide coatings are to be produced. Also, melts of hydrated metal chloride and nitrate compounds can suitably be used for coating by immersion instead of aqueous solutions.

Metals selected for incorporation into the oxide coatings of the invention should form hydrated oxides which are not readily soluble in alkaline ammonia-containing solutions. For the purposes of the present invention, limited solubility may be tolerated, but this is not to be preferred since it will decrease the amount of hydrated oxide remaining on the support structure after the ammonia treatment, as well as the uniformity thereof. Metals which are preferred for use as support coatings in the present invention are those which form refractory metal oxides having high surface areas which are not excessively diminished under high temperature conditions. Such oxides are particularly preferred for automotive applications where catalyst support coatings are subjected to high temperatures. Examples of these preferred metals are aluminum, titanium, tin, zirconium and thorium. Among the metals which are preferred for deposition to form catalytically-active oxides are the 3d-transition metal ions such as chromium, manganese and iron.

Following immersion of the porous support structure, the in situ precipitation of hydrated metal oxides from the ionic solution present on the structure is induced by contact with ammonia. For the purposes of the present invention, contact with ammonia comprises contact with aqueous ammonia alkaline solutions such as ammonium hydroxide or ammonium carbonate or, alternately, contact with an ammonia-containing atmosphere. In the former case, the impregnated support structure is conveniently contacted by immersion in the selected ammonium hydroxide or ammonium carbonate solution, or the like, for a period of time at least sufficient to cause the in situ precipitation of hydrated metal oxide onto the support structure. Preferably, the selected solution should be concentrated enough to prevent local neutralization of the alkaline medium, which can result in a decrease in the adherence of the precipitate to the support. Typically, the ammonia alkaline solution will contain ammonia in excess of the amount required to completely precipitate all of the metal ions present in the impregnated ionic solution, and the immersion will be continued for a time at least sufficient to complete the precipitation of all of the available metal. Suitable alternative ammonia alkaline solutions include ammonium hydroxide-hydrogen peroxide mixtures and ammonium hydroxide solutions containing metal-amine complexes.

In the case of treatment with an ammonia-containing atmosphere, precipitation in situ is accomplished by passing a gas containing ammonia through the support structure; however, precautions should be taken to insure that evaporation of the ionic metal solution from the porous structure is minimized. Evaporation causes migration of the metallic compounds, and an aqueous environment is required to obtain complete precipitation of the hydrated metal oxides. Suitable gases for use in our process include ammonia and mixtures of ammonia and air or other carrier gases.

Hydrated oxides which are precipitated upon and within the pores of the support structure according to the described procedure include the hydrous oxides, oxyhydrates, or hydroxides of the selected metals. The exact species precipitated is not critical; it depends merely on the metal selected and on the precipitation procedures employed. In each case, the precipitated species may be dehydrated and converted to the oxide form by heating to a temperature at least sufficient to release adsorbed and chemically bound water for a period of time at least sufficient to achieve the desired degree of dehydration. This step also effectively removes volatile reaction by-products such as ammonium salts. Temperatures in excess of 600°C. and times in excess of 24 hours are seldom required for these purposes.

The deposition of a catalyst onto the oxide support coatings of the invention may be accomplished by any of the various means known in the art. We prefer a procedure in which the catalyst is deposited on the hydrated oxide coating (prior to drying) using an adsorption technique. The procedure comprises contacting the hydrated oxide coating with an aqueous alkaline solution containing complex noble metal-amine cations to cause the adsorption of the complex noble metal-amine cations onto the oxide coating. The adsorbed catalyst is then converted to the metallic state by calcination or reducing techniques. This procedure is shown in more detail in the following detailed examples, and is completely described and claimed in the copending application of G. F. Foster, H. E. Meissner and J. L. Stiles, Ser. No. 243,416 filed Apr. 12, 1974, and now abandoned, entitled "Process for Depositing Noble Metal Catalysts," commonly assigned herewith, to which reference may be made for further explanation of these matters. Of course, alternative well-known deposition techniques such as noble metal salt impregnation and decomposition may be employed, and these will be preferred where the nature of the catalyst or the oxide support coating does not permit the use of our adsorption procedure.

The invention may be further understood by reference to the following detailed examples of the processes hereinbefore described. Of course, these examples are merely representative of the variety of procedures which may be utilized according to the present invention within the scope of the appended claims.

EXAMPLE I

Mixed $Al_2O_3$-$Mn_3O_4$ Oxide Support Coating

A cordierite ceramic monolithic support structure of cylindrical shape (1 inch diameter and 2–5/16 feet length) with about 230 parallel channels per square inch cross sectional area, weighing 18.54 grams, was impregnated with a solution containing $Al_2O_3$ and $MnO_2$ in a mole ratio of 1:1. The solution consisted of 25.08 grams of a 50 percent solution of $Al(NO_3)_3 \cdot 9H_2O$ and 12.38 grams of a 50 percent manganous nitrate solution; impregnation was accomplished by immersion in the solution. After a contact time of 10 minutes, the structure was removed from the solution and excess liquid was removed by shaking. The structure was then plunged into a solution of concentrated $NH_4OH$, soaked for 10 minutes, and dried for 16 hours at 80°C. A coating composed of 1.43 grams of coprecipitated hydrated aluminum and manganese oxides was found on the monolithic support.

Platinum in the amount of 0.040 grams was then applied to the structure as a catalyst by an adsorption method in alkaline medium. The structure was first treated for 24 hours in a solution consisting of equal weights of concentrated $NH_4OH$ and $H_2O$, and then immersed into 30 cc. of a solution containing an ammonia-alkaline platinum amine complex which comprised 0.040 grams of platinum metal. This solution was prepared by dissolving a suitable quantity of $(NH_4)_2PtCl_6$ in a solution composed of 1 part concentrated $NH_4OH$ and 9 parts $H_2O$ by weight, and digesting for several hours. The structure remained in this solution for 24 hours to allow uniform adsorption of the platinum compound onto the oxide coating.

Thereafter the structure was removed from the spent catalyst solution, which had been quantitatively depleted of platinum by contact with the structure. It was then rinsed with distilled water, dried at 100°C. for 2 hours, and heated in a vacuum to 300°C. at the furnace rate. After maintaining at 300°C. for 1 hour in vacuum, a gas mixture consisting of 90 percent $N_2$ and 10 percent $H_2$ by volume was introduced, and a slow rate of flow of this gas mixture through the structure was maintained for 1 hour. The sample was then cooled at the furnace rate to 100°C., and the gas stream was interrupted.

The completed device was then subjected to accelerated thermal aging by firing at 800°C. in air for 24 hours. Thereafter, it was tested as an oxidative catalytic device in a simulated exhaust gas mixture containing 250 ppm propylene, 1% CO, 1.25% $O_2$, 10% $H_2O$ vapor and the balance nitrogen by weight, passing through the device at a space velocity of about 15,000 hr.$^{-1}$. It exhibited excellent catalytic activity, converting 50 percent of the available carbon monoxide at 485°F. and 50 percent of the available propylene at 570°F.

EXAMPLE II $SnO_2$ Oxide Support Coating

A cordierite ceramic monolithic support structure of cylindrical shape (1 inch diameter and 2-5/16 inches height) with about 230 parallel channels per square inch cross sectional area, weighing 11.68 grams, was provided with a base coating of high surface area alumina by repeated immersion into a melt of aluminum isopropoxide at a temperature of 100°–120°C. followed by hydrolysis in a steam atmosphere at 120°C. and 18 psi for 30 minutes. After heating at 600°C. for 2 hours to dehydrate the coating, a weight gain of 0.62 grams of alumina was observed.

A coating of hydrous stannic oxide was applied on top of the alumina-coated structure. For this purpose, a solution composed of 73.8 grams $SnCl_4.5H_2O$ and 176.2 grams $H_2O$ was prepared, and the structure was immersed in this solution at room temperature for 10 minutes. Thereafter, excess liquid was removed and the structure was plunged into a solution of concentrated ammonium hydroxide. This caused the precipitation of hydrous stannic oxide with some $NH_4Cl$ still remaining in the precipitate. The structure was then dried at 80°C. for 1 hour, and a weight increase of 0.04 grams due to the hydrous stannic oxide coating was observed.

This coating is especially useful as a support coating for noble metal catalysts which are active for the reduction of the oxides of nitrogen present in automotive exhaust gases.

EXAMPLE III

Copper-Containing Chromium Oxide Catalytic Coating

A beta-spodumene glass-ceramic support structure of cylindrical shape (1 inch diameter and 2-5/16 inches height) with about 360 parallel channels per square inch cross sectional area, weighing 20.83 grams, was coated with two layers of high surface area alumina according to the procedure described in Example II. After heating the sample at 600°C. for 24 hours a weight gain of 2.89 grams due to the alumina coating was observed.

Subsequently the sample was impregnated by repeated dipping into titanium tetraisopropoxide at room temperature, and the alkoxide was then transformed to hydrous titania of the approximate composition $TiO_2.H_2O$ by steam hydrolysis at 120°C. and 18 psi for 30 minutes. This procedure was then repeated, and the total weight gain due to the resulting high-surface-area titania coating was found to be 3.38 grams.

The sample was then impregnated by immersion in a solution prepared by mixing 104 grams of $Cr(NO_3)_3.9H_2O$ and 40 grams of $H_2O$ at room temperature. A vacuum was applied for 30 minutes during the immersion process to facilitate the penetration of solution into the pore structure of the coating. After releasing the vacuum the structure was removed and excess liquid was shaken out.

Thereafter, the structure was immersed for 30 minutes under vacuum in a solution consisting of 100 grams $Cu(NO_3)_2.3H_2O$, 100 grams $H_2O$, and 100 grams of concentrated $NH_4OH$. This treatment caused the in situ precipitation of chromium nitrate as hydrous chromium oxide, and also resulted in the retention of a significant amount of $Cu(NH_3)_4^{2+}$ from the precipitating hydroxide solution in the chromium oxide coating. The sample was then dried at 120°C. for 2 hours, fired to 600°C., and held at this temperature for 3 hours.

The catalytic activity of the device prepared as described was then determined according to the method described in Example I. Conversion temperatures at which 50 percent of the available propylene and 50 percent of the available CO were oxidized to $CO_2$ and $H_2O$ were found to the 550°F. and 345°F., respectively. These values changed to 660°F. and 490°F., respectively after subjecting the sample to an accelerated aging treatment of heating at 800°C. in air for 24 hours.

EXAMPLE IV

Mixed $Mn_3O_4$-$MnO_2$ Oxide Support Coating

A cordierite ceramic support structure of cylindrical shape (1 inch diameter and 2-5/16 inches height) with about 230 parallel channels per square inch cross sectional area, weighing 13.38 grams, was coated with one layer of high surface area alumina by the procedure described in Example II. After heating this structure to 600°C. for 16 hours, a weight gain of 0.69 grams due to the alumina coating was observed.

The structure was then impregnated with a commercially-obtained manganous nitrate solution, of which manganous nitrate made up about 50 percent by weight. Impregnation was accomplished by immersion of the structure in the solution for 2 to 3 minutes at room temperature. The structure was then exposed to $NH_3$-vapor for 1 minute, dried at 80°–90°C. for 2 hours, inserted into a furnace at 300°C. and maintained at this temperature for 30 minutes to volatilize any remaining water, ammonia and by-product compounds. A uniform and well-adhering coating consisting of 0.80 grams manganese oxide was found to result from this procedure.

A platinum catalyst was then deposited onto the above coating by the procedure outlined in Example I, and the device was tested as an oxidation catalyst, after accelerated thermal aging at 800°C. for 24 hours in air, by the method described in Example I. The device was found to convert 50 percent of the available carbon monoxide and 50 percent of the available propylene to $CO_2$ and $H_2O$ at 500°F.

From the above description and examples, it is apparent that the process of the present invention provides a useful means for depositing metal oxide coatings on porous support structures, and that the oxide coatings produced according to the process of the present invention are eminently suitable for use in combination with monolithic support structures and known catalysts to provide useful catalytic devices for the treatment of gases.

We claim:

1. A process for providing a catalyst on a uniform, tightly-adherent, high-surface-area oxide catalyst support coating deposited on the porous interior channel walls of a refractory monolithic support structure of the honeycomb type which comprises:
   a. impregnating the porous interior channel walls of the support structure with an aqueous ionic solution of at least one metal selected from the group consisting of aluminum, titanium, tin, zirconium, thorium, chromium, manganese, iron, gallium, niobium, magnesium, tantalum, and hafnium;
   b. contacting the thus-impregnated porous support structure with ammonia or an aqueous ammonia alkaline solution to cause the in situ precipitation on the support structure of a uniform, tightly-adherent, high-surface-area coating consisting essentially of the hydrated oxides of the selected metals; and
   c. depositing a noble metal catalyst on the high-surface-area coating.

2. A process according to claim 1 wherein the aqueous ionic solution is a concentrated aqueous solution of ionic compounds of the selected metals and has a pH value not exceeding about 7.

3. A process according to claim 2 wherein impregnating the porous interior channel walls of the support structure comprises immersing the support structure in the aqueous ionic solution for a period of time at least sufficient to thoroughly wet the porous surface thereof.

4. A process according to claim 3 wherein the aqueous ionic solution contains ionic compounds of metals selected from the group consisting of aluminum, titanium, tin, zirconium, thorium, chromium, manganese, and iron.

5. A process according to claim 4 wherein contacting the thus-impregnated porous support structure comprises contact with an aqueous ammonia alkaline solution of at least one compound selected from the group consisting of ammonium hydroxide and ammonium carbonate.

6. An hydrated-oxide-coated support structure produced according to the process of claim 1.

* * * * *